United States Patent
Lee et al.

(10) Patent No.: US 7,663,583 B2
(45) Date of Patent: Feb. 16, 2010

(54) IN-PLANE SWITCHING MODE LIQUID CRYSTAL DISPLAY DEVICE

(75) Inventors: Jae Kyun Lee, Gunpo-shi (KR); Dong Hoon Lee, Anyang-shi (KR)

(73) Assignee: LG Display Co., Ltd., Seoul (KR)

( * ) Notice: Subject to any disclaimer, the term of this patent is extended or adjusted under 35 U.S.C. 154(b) by 609 days.

(21) Appl. No.: 11/025,247

(22) Filed: Dec. 28, 2004

(65) Prior Publication Data

US 2005/0139837 A1  Jun. 30, 2005

(30) Foreign Application Priority Data

Dec. 30, 2003  (KR) .................. 10-2003-0100857

(51) Int. Cl.
  *H01L 29/04*  (2006.01)
(52) U.S. Cl. ............... 345/87; 345/204; 349/141; 349/143; 349/46; 257/72
(58) Field of Classification Search ............ 345/87; 257/72, 59; 349/143
  See application file for complete search history.

(56) References Cited

U.S. PATENT DOCUMENTS

| 5,977,562 | A * | 11/1999 | Hirakata et al. | 257/72 |
|---|---|---|---|---|
| 6,266,116 | B1 * | 7/2001 | Ohta et al. | 349/141 |
| 6,335,770 | B1 * | 1/2002 | Komatsu | 349/38 |
| 6,421,039 | B1 * | 7/2002 | Moon et al. | 345/100 |
| 6,429,842 | B1 * | 8/2002 | Shin et al. | 345/92 |
| 6,587,160 | B2 * | 7/2003 | Lee et al. | 349/40 |
| 6,624,869 | B2 * | 9/2003 | Lee | 349/149 |
| 6,646,691 | B1 * | 11/2003 | Watanabe et al. | 349/39 |
| 6,806,935 | B2 * | 10/2004 | Song | 349/141 |

(Continued)

FOREIGN PATENT DOCUMENTS

JP  11-282431  10/1999

(Continued)

OTHER PUBLICATIONS

Office Action dated Sep. 28, 2006 for corresponding Korean Patent Application No. 10-2003-0100857.

(Continued)

*Primary Examiner*—Sumati Lefkowitz
*Assistant Examiner*—Grant D Sitta
(74) *Attorney, Agent, or Firm*—Brinks Hofer Gilson & Lione (57) ABSTRACT

An IPS mode LCD device is disclosed in which a common voltage drop and delay is decreased. The LCD includes gate and data lines crossing each other to define pixel regions. Thin film transistors are formed at crossing portions of the gate and data lines. Common lines are parallel with the gate lines and common electrodes project from the common lines parallel with the data lines. Pixel electrodes connected with drain electrodes of the thin film transistors are formed in the pixel regions between the parallel common electrodes. A first common voltage supplying line applies a first common voltage or a second common voltage to a closed circuit formed by grouping the adjacent odd numbered common lines. A second common voltage supplying line applies the second common voltage or the first common voltage to a closed circuit formed by grouping the adjacent even numbered common lines.

10 Claims, 12 Drawing Sheets

U.S. PATENT DOCUMENTS

| | | | |
|---|---|---|---|
| 6,806,937 B2 * | 10/2004 | Park et al. | 349/149 |
| 6,816,221 B2 * | 11/2004 | Oke et al. | 349/141 |
| 6,864,937 B2 * | 3/2005 | Moon et al. | 349/139 |
| 6,958,791 B2 * | 10/2005 | Shimoshikiryo | 349/85 |
| 6,963,335 B2 * | 11/2005 | Tanaka et al. | 345/204 |
| 6,987,551 B2 * | 1/2006 | Suzuki et al. | 349/141 |
| 7,157,303 B2 * | 1/2007 | Son | 438/74 |
| 7,319,448 B2 * | 1/2008 | Kim et al. | 345/87 |
| 7,391,402 B2 * | 6/2008 | Lee | 345/96 |
| 2002/0044246 A1 * | 4/2002 | Moon et al. | 349/141 |
| 2004/0085503 A1 * | 5/2004 | Kim et al. | 349/141 |
| 2004/0095541 A1 * | 5/2004 | Takeichi et al. | 349/139 |

FOREIGN PATENT DOCUMENTS

JP     2001-356356     12/2001

OTHER PUBLICATIONS

Office Action dated Nov. 3, 2006 for corresponding Chinese Patent Application No. 2004101035979.

* cited by examiner

IN-PLANE SWITCHING MODE LIQUID CRYSTAL DISPLAY DEVICE

The present invention claims the benefit of the Korean Application No. P2003-100857, filed on Dec. 30, 2003, which is hereby incorporated by reference.

BACKGROUND

1. Field of the Invention

The present invention relates to an In-Plane Switching (IPS) mode liquid crystal display (LCD) device, and more particularly, to an IPS mode LCD device to decrease a common voltage drop and delay.

2. Discussion of the Related Art

A liquid crystal display (LCD) device is a flat display. The LCD device changes optical anisotropy by applying an electric field to a liquid crystal layer. The LCD device has been widely used as it has a number of advantageous characteristics as compared with a conventional display using a cathode ray tube (CRT). These characteristics include low power consumption, thin profile, high resolution, and suitableness for a large size.

The LCD device includes an LCD panel for displaying images, and a driving circuit part for supplying driving signals to the LCD panel. Also, the LCD panel includes first and second substrates bonded to each other at a predetermined interval therebetween, and a liquid crystal layer formed between the first and second substrates by injection of a liquid crystal material.

At this time, the first substrate (thin film transistor array substrate) includes a plurality of gate lines arranged in a first direction at fixed intervals, a plurality of data lines arranged in a second direction perpendicular to the gate lines at fixed intervals, a plurality of pixel electrodes in respective pixel regions defined by the gate lines and the data lines arranged in a matrix-type configuration, and a plurality of thin film transistors (TFTs) being switchable in response to a signal of the gate line for transmission of a signal of the data line to the pixel electrode. Also, the second substrate (color filter array substrate) has a black matrix layer for shielding light from areas excluding the pixel regions, and an R/G/B color filter layer for displaying various colors. A predetermined interval is maintained between the first and second substrates by spacers, and the first and second substrates are bonded to each other by a sealant having an injection inlet. Then, the liquid crystal material is injected between the first and second substrates.

The LCD device has various modes according to the properties of the liquid crystal used and the pattern structure. More specifically, the LCD device is categorized into a Twisted Nematic (TN) mode for controlling liquid crystal director by applying a voltage after arrangement of liquid crystal director twisted at 90°, a multi-domain mode for obtaining a wide viewing angle by dividing one pixel into several domains, an Optically Compensated Birefringence (OCB) mode for compensating a phase change of light according to progressing direction of light by forming a compensation film on an outer surface of a substrate, an In-Plane Switching (IPS) mode for forming an electric field parallel to two substrates by forming two electrodes on any one substrate, and a Vertical Alignment (VA) mode for arranging a longitudinal (major) axis of liquid crystal molecule vertical to a plane of an alignment layer by using negative type liquid crystal and vertical alignment layer.

Among these types of LCD devices, the IPS mode LCD device has a pixel electrode and a common electrode formed on the same substrate. That is, the IPS mode LCD device includes a first substrate having gate and data lines crossing each other to define a pixel region, a switching device formed at a crossing point of the gate and data lines, and the common and pixel electrodes alternately formed to generate an electric field parallel to the two substrates.

Hereinafter, a related art IPS mode LCD device and a method for fabricating the same will be described with reference to the accompanying drawings.

Figure 1:
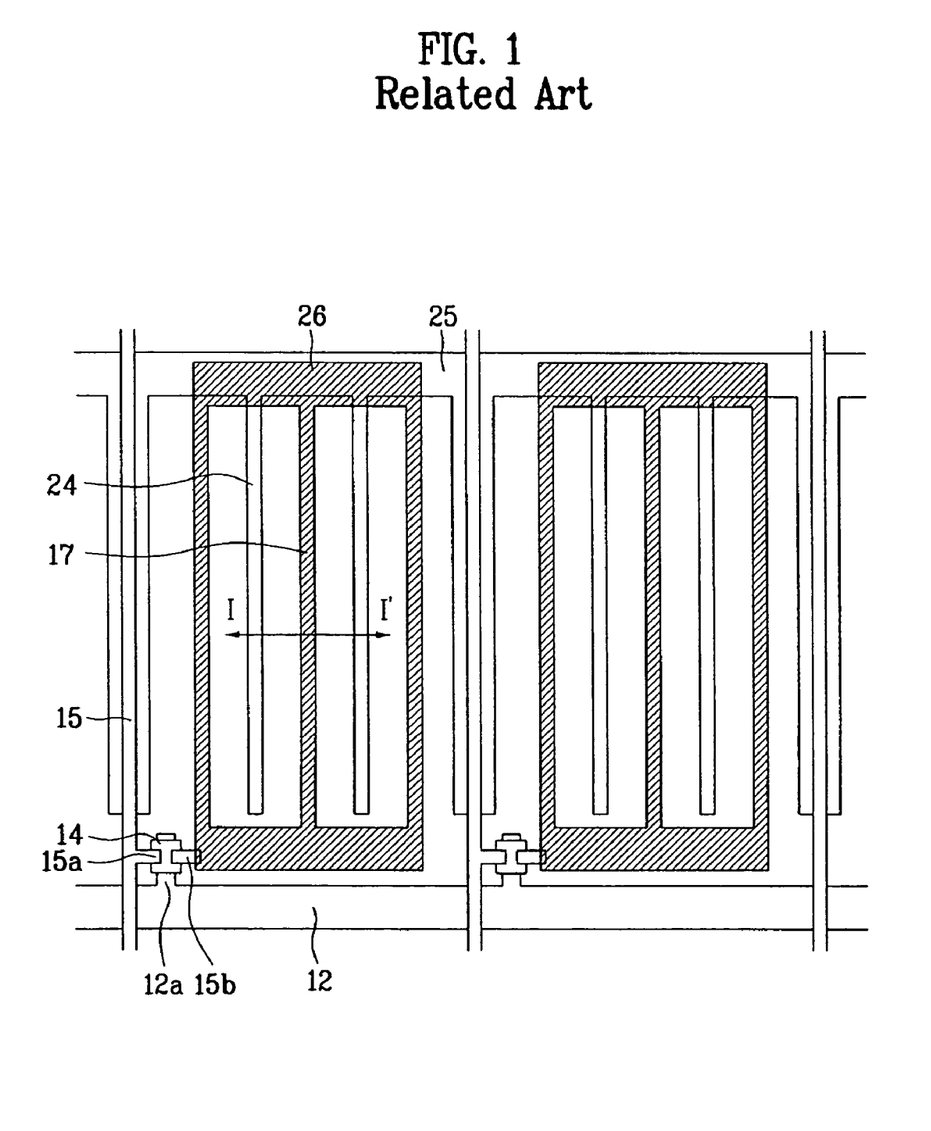
FIG. 1 is a plane view of a unit pixel in an IPS mode LCD device according to the related art.
Figure 2:
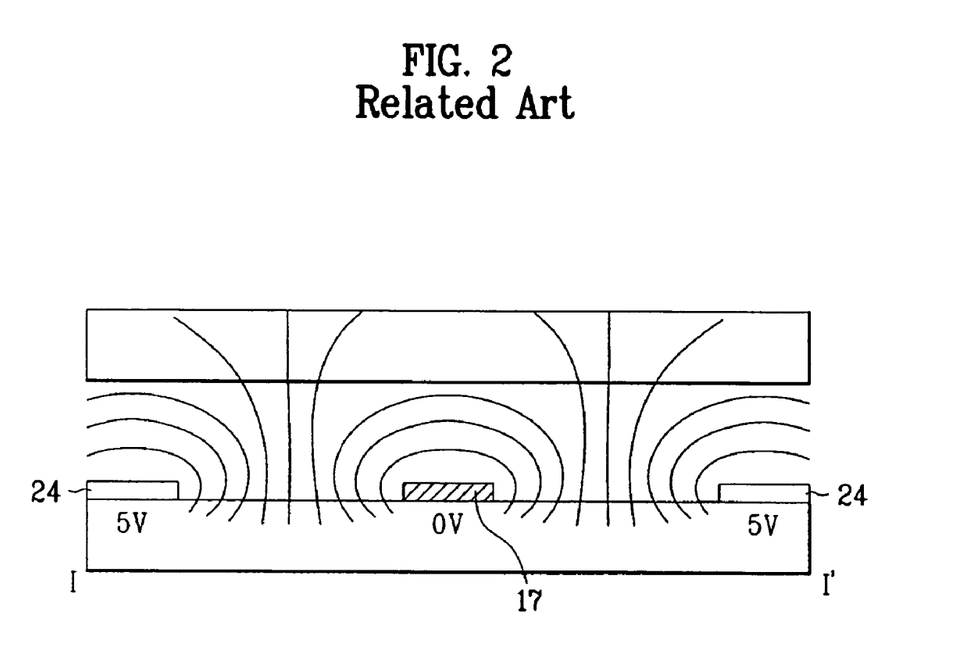
FIG. 2 is a voltage distribution of an IPS mode LCD device along I-I' of FIG. 1.
Figure 3A:
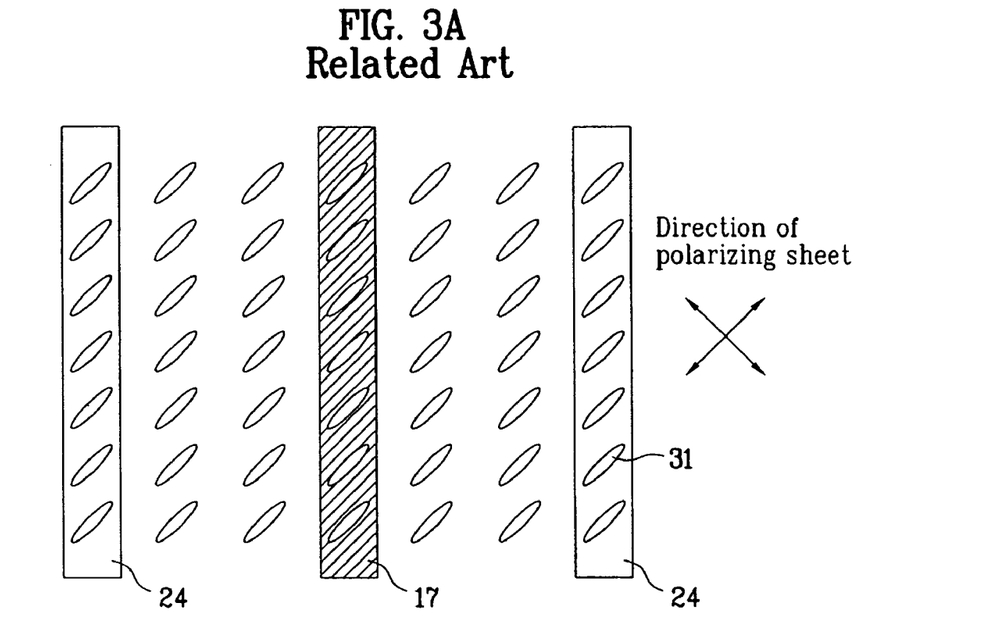
FIG. 3A and FIG. 3B are plane views of an IPS mode LCD device when a voltage is turned on/off.
Figure 3B:
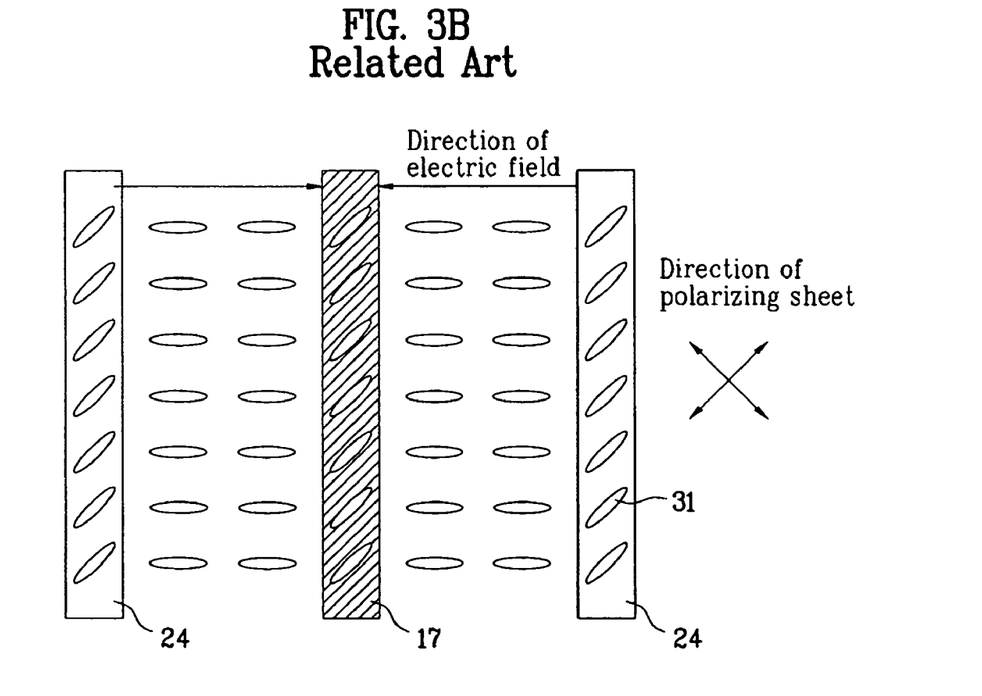

FIG. 1 is a plane view of a unit pixel of an IPS mode LCD device according to the related art. FIG. 2 is a voltage distribution of an IPS mode LCD device along I-I' of FIG. 1. FIG. 3A and FIG. 3B are plane views of an IPS mode LCD device when a voltage is turned on/off.

That is, as shown in FIG. 1, a thin film transistor array substrate 11 includes a gate line 12, a data line 15, a thin film transistor TFT, a common line 25, a plurality of common electrodes 24, a plurality of pixel electrodes 17, and a capacitor electrode 26. At this time, the gate line 12 is formed along one direction on the thin film transistor array substrate 11, and the data line 15 is formed perpendicular to the gate line 12 to define a pixel region. Also, the thin film transistor TFT is formed at a crossing portion of the gate and data lines 12 and 15. Then, the common line 25 is formed parallel to the gate line 12 within the pixel region. The plurality of common electrodes 24, diverging from the common line 25, are formed parallel to the data line 15 within the pixel region. Also, the plurality of pixel electrodes 17 are connected with a drain electrode of the thin film transistor TFT, and each of the pixel electrodes 17 is provided between the common electrodes 24 in parallel. The capacitor electrode 26 extending from the pixel electrode 17 is formed on the common line 25.

In addition, the thin film transistor TFT is comprised of a gate electrode 12a diverging from the gate line 12, a gate insulating layer (not shown) formed on an entire surface of the thin film transistor array substrate 11 including the gate electrode 12a, a semiconductor layer 14 formed on the gate insulating layer above the gate electrode 12a, and source and drain electrodes 15a and 15b diverging from the data line 15, and formed at both sides of the semiconductor layer 14.

At this time, the common line 25 may be formed as one with the common electrode 24, and the gate line 12 may be formed as one with the gate electrode 12a. Also, the common line 25 and the gate line 12 may be formed of a low-resistance material at the same time.

The pixel electrodes 17 are formed of a transparent conductive metal material having great transmittance, for example, indium-tin-oxide (ITO). Each pixel electrode 17 alternates with the common electrode 24. Also, the pixel electrode 17 is in contact with the drain electrode of the thin film transistor TFT, whereby the pixel electrode 17 receives a voltage.

Also, on the common line 25, the capacitor electrode 26 is formed as one with the pixel electrode 17, thereby forming a storage capacitor.

In the related art IPS mode LCD device, as shown in FIG. 2, if 5V is applied to the common electrode 24, and 0V is applied to the pixel electrode 17, an equipotential surface is formed in parallel to the electrodes at the portions right on the electrodes, and the equipotential surface is formed nearly perpendicular to the electrodes at the portion between the two electrodes. Thus, since an electric field is perpendicular to the equipotential surface, a horizontal electric field is formed between the common electrode 24 and the pixel electrode 17, a vertical electric field is formed on the respective electrodes, and both the horizontal and vertical electric fields are formed in the edge of the electrode.

An alignment of liquid crystal molecules in the related art IPS mode LCD device is controlled with the electric field. For example, as shown in FIG. 3B, if a sufficient voltage is applied to liquid crystal molecules 31 initially aligned at the same direction as a transmission axis of one polarizing sheet, long axes of the liquid crystal molecules 31 are aligned in parallel to the electric field. In case the dielectric anisotropy of the liquid crystal is negative, short axes of the liquid crystal molecules are aligned in parallel to the electric field.

More specifically, first and second polarizing sheets are formed on outer surfaces of the thin film transistor array substrate and the color filter substrate bonded to each other. The transmission axes of the first and second polarizing sheets are perpendicular to each other. Also, an alignment layer formed on the lower substrate is rubbed in parallel to the transmission axis of one polarizing sheet. This sets the display in a normally black mode.

That is, if the voltage is not provided to the LCD panel, as shown in FIG. 3A, the liquid crystal molecules 31 are aligned to display the black state. As shown in FIG. 3B, if the voltage is provided to the LCD panel, the liquid crystal molecules 31 are aligned in parallel to the electric field, thereby displaying the white state.

An operation of the related art IPS mode LCD device will be described as follows.

The general LCD devices inclusive of the IPS mode LCD device have the pixel regions arranged in the matrix-type configuration. In the general LCD devices, the video signal is applied to the corresponding pixel region when a scanning signal is inputted to one gate line.

The liquid crystal material injected between the first and second substrates may deteriorate when a DC voltage is applied for a long time. In order to prevent such a problem, a polarity of the supplied voltage is cyclically changed, which is commonly referred to as a polarity inversion method. The polarity inversion method is classified into a frame inversion method, a line inversion method, a column inversion method, and a dot inversion method.

In the frame inversion method, positive and negative polarities of a data voltage supplied to the liquid crystal material for a common electrode voltage are alternately supplied during each frame. For example, if a positive (+) polarity data voltage is supplied to an even frame, a negative (−) polarity data voltage is supplied to an odd frame. Thus, the same polarity data voltage is supplied according to the even or odd frame, thereby decreasing consumption current during a switching mode. However, the frame inversion method is sensitive to flicker generated according to an asymmetrical transmittance between the positive and negative polarities. In addition, the frame inversion method is susceptible to crosstalk caused by interference between data signals of adjacent pixels.

The line inversion method is commonly used for low-resolution devices (i.e., VGA and SVGA), in which a data voltage is supplied such that a polarity of a data voltage supplied to the liquid crystal material for a common electrode voltage is changed according to a vertical direction. For example, in a first frame, a positive (+) polarity data voltage is supplied to an odd gate line, and a negative (−) polarity data voltage is supplied to an even gate line. Next, in a second frame, the negative (−) polarity data voltage is supplied to the odd gate line, and a positive (+) polarity data voltage is supplied to the even gate line. In the line inversion method, the polarities of the data voltage are oppositely supplied to adjacent lines such that a luminance difference is offset between the lines according to spatial averaging, thereby preventing the flicker during frame inversion. For example, the opposite-polarity data voltages are supplied along a vertical direction, so that a coupling phenomenon of the data signals is offset, thereby decreasing vertical crosstalk during the frame inversion. However, the polarity of the data voltage is the same along a horizontal direction, so that horizontal crosstalk is generated, and consumption current is increased due to an increase of the number of switching operations, as compared with that during the frame inversion.

In the column inversion method, the same polarity of a data voltage supplied to liquid crystal material for a common electrode voltage is supplied in the vertical direction, and positive and negative polarities of the data voltage are alternately supplied along the horizontal direction. Thus, it is possible to minimize flicker by spatial averaging and to minimize horizontal crosstalk. However, the column inversion method requires a high-voltage column drive IC since the opposite-polarity data voltages are supplied to the adjacent lines according to the vertical direction.

The dot inversion method is supplied to high-resolution devices (i.e., XGA, SXGA, and UXGA) for obtaining the greatest quality picture image. In the dot inversion method, a polarity of a data voltage is differently supplied to all-direction adjacent pixels. Accordingly, it is possible to minimize flicker by spatial averaging. However, the dot inversion method is problematic since the dot inversion method has a high consumption current by using a high-voltage source driver.

Figure 4:
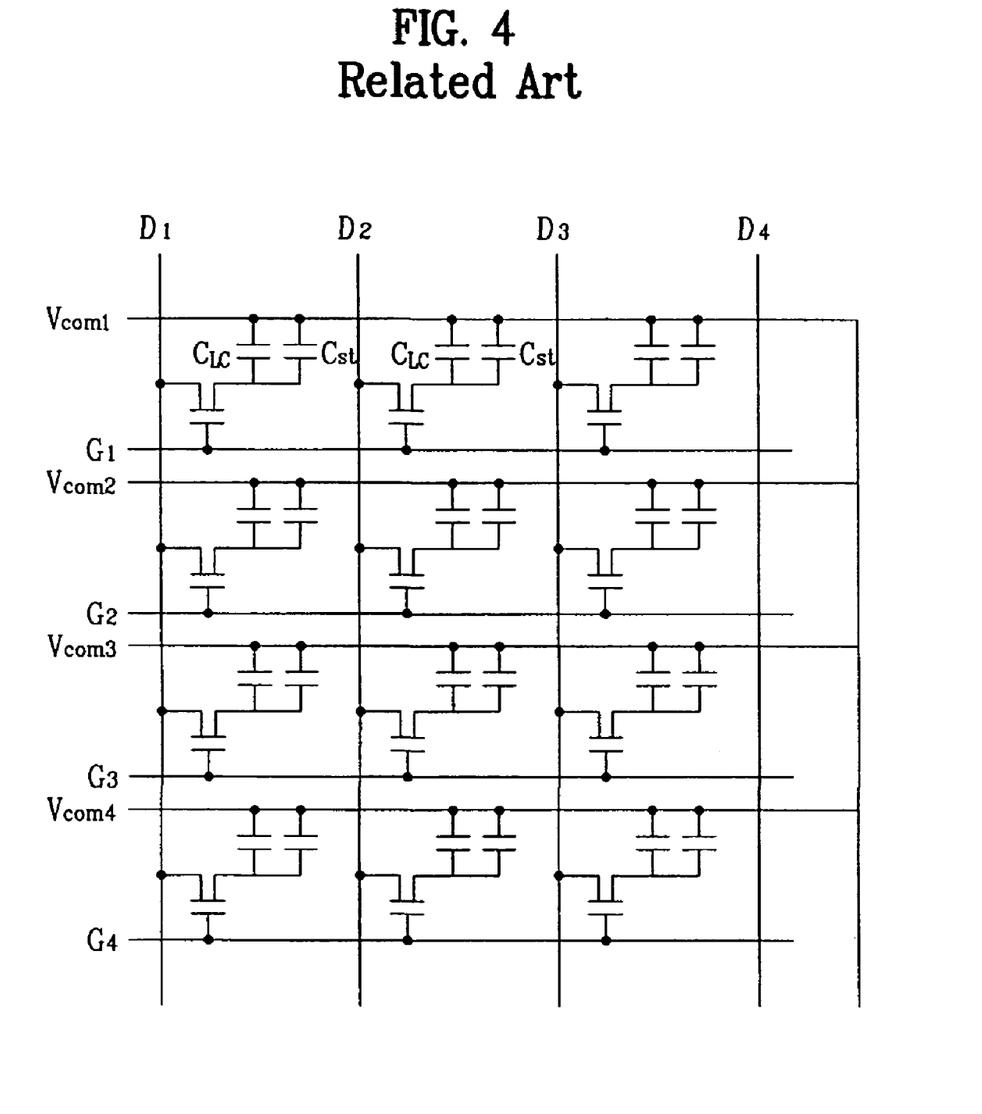
FIG. 4 is an equivalent circuit view of an IPS mode LCD device according to the related art.
Figure 5:
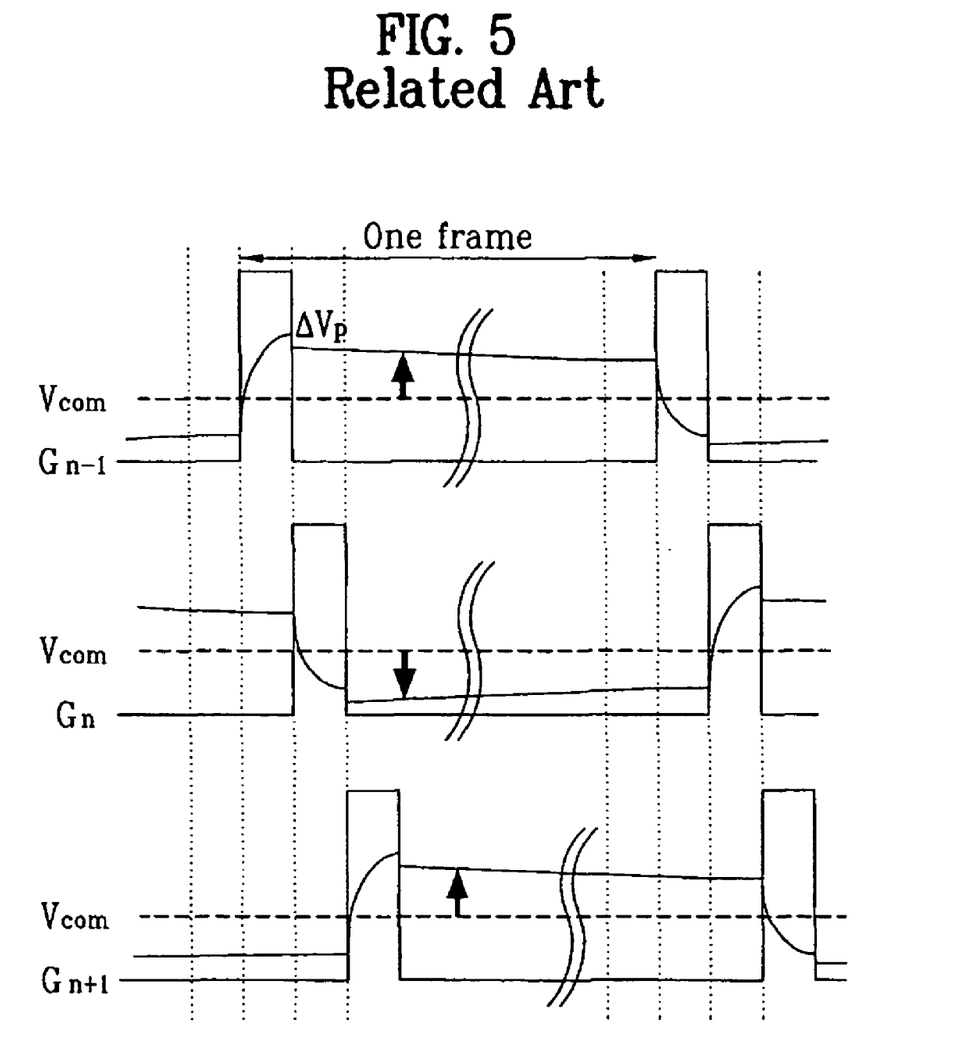
FIG. 5 is a timing view of a pixel voltage in each gate line of FIG. 4.

Hereinafter, a related art IPS mode LCD device of a dot inversion method will be described as follows. FIG. 4 is an equivalent circuit view of an IPS mode LCD device according to the related art. FIG. 5 is a timing view of a pixel voltage in each gate line of FIG. 4.

In a unit pixel of the related art IPS mode LCD device, a plurality of thin film transistors TFT are formed at respective crossing portions of gate lines (G1, G2, G3, . . . ) and data lines (D1, D2, D3, . . . ). Also, each of common lines (Vcom1, Vcom2, Vcom3, . . . ) is formed between each of the gate lines. Then, a storage capacitor $C_{st}$ and a liquid crystal capacitor $C_{LC}$ are formed in parallel between a pixel electrode ('17' of FIG. 1) connected with a drain electrode in each thin film transistor and the common line.

At this time, the polarity of a data voltage applied to each data line is inversely applied to respective pixels by each horizontal period. That is, the data voltage is applied such that positive (+) and negative (−) polarities are inversely applied to the respective pixels by each horizontal period. When a gate pulse is applied to the corresponding gate line so as to drive the pixel, the thin film transistor of the corresponding gate line is turned-on, whereby the data voltage is applied to the pixel electrode. Then, the liquid crystal capacitor $C_{LC}$ and the storage capacitor Cst, connected between the drain electrode of the thin film transistor and the common line (the pixel electrode and common line), are charged during turning-on the thin film transistor. After turning-off the thin film transistor, electric charges are maintained until the thin film transistor is turned-on.

At this time, as shown in FIG. 5, a DC voltage having an intermediate level between the positive (+) and negative (−) polarities of the data voltage is applied without regard to the pixel, the gate line, or the frame.

Accordingly, a pixel voltage is changed by a difference amount ΔVp according to a parasitic capacitor Cgs formed between gate and source electrodes of the thin film transistor along a falling edge of a scanning signal supplied to the gate line. Then, the pixel voltage having a falling value by the difference amount ΔVp is induced to the pixel electrode.

However, when driving the related art IPS mode LCD device, a constant DC value is supplied as a common voltage, and the positive (+) and negative (−) polarity data voltages for the common voltage signal are alternately supplied to the data lines of the respective pixels. Thus, the pixel voltage Vp supplied to the liquid crystal has the polarity dependent on the data voltage, so that it is required to use a source driver having a great output voltage difference to induce a high voltage to the liquid crystal material, thereby increasing the cost.

In the related art IPS mode LCD device, the liquid crystal is driven according to a fringe field formed between the pixel electrode and the common electrode. Accordingly, it is required to form the fringe field having a great value by narrowing an interval between the pixel electrode and the common electrode.

In order to narrow the interval between the pixel electrode and the common electrode, it is necessary to pattern the pixel and common electrodes in a finger type crossed at a predetermined interval when patterning the pixel and common electrodes. However, if the interval between the pixel electrode and the common electrode becomes narrow, an aperture ratio of the pixel becomes low. To improve the aperture ratio, the pixel or common electrode may be formed of a transparent material, such as ITO (Indium-Tin-Oxide). However, patterns of the pixel and common electrodes having various shapes are formed within the pixel region so that it is difficult to uniformly transmit the light therethrough. When widening the interval between the pixel electrode and the common electrode for improving the aperture ratio, the electric field parallel to the substrates decreases between the pixel electrode and the common electrode. Thus, in order to obtain the required luminance, a data voltage of a high output range is required.

Recently, an IPS mode LCD device and a method for driving the same, to obtain the high liquid crystal voltage between the common electrode and the pixel electrode without using the high output source driver, and to improve picture quality with swing of the common voltage, by supplying the data voltage and the common voltage of the opposite polarity to the odd/even numbered common lines, for the increase of electrode interval and the drop of driving voltage, has been proposed.

Figure 6:
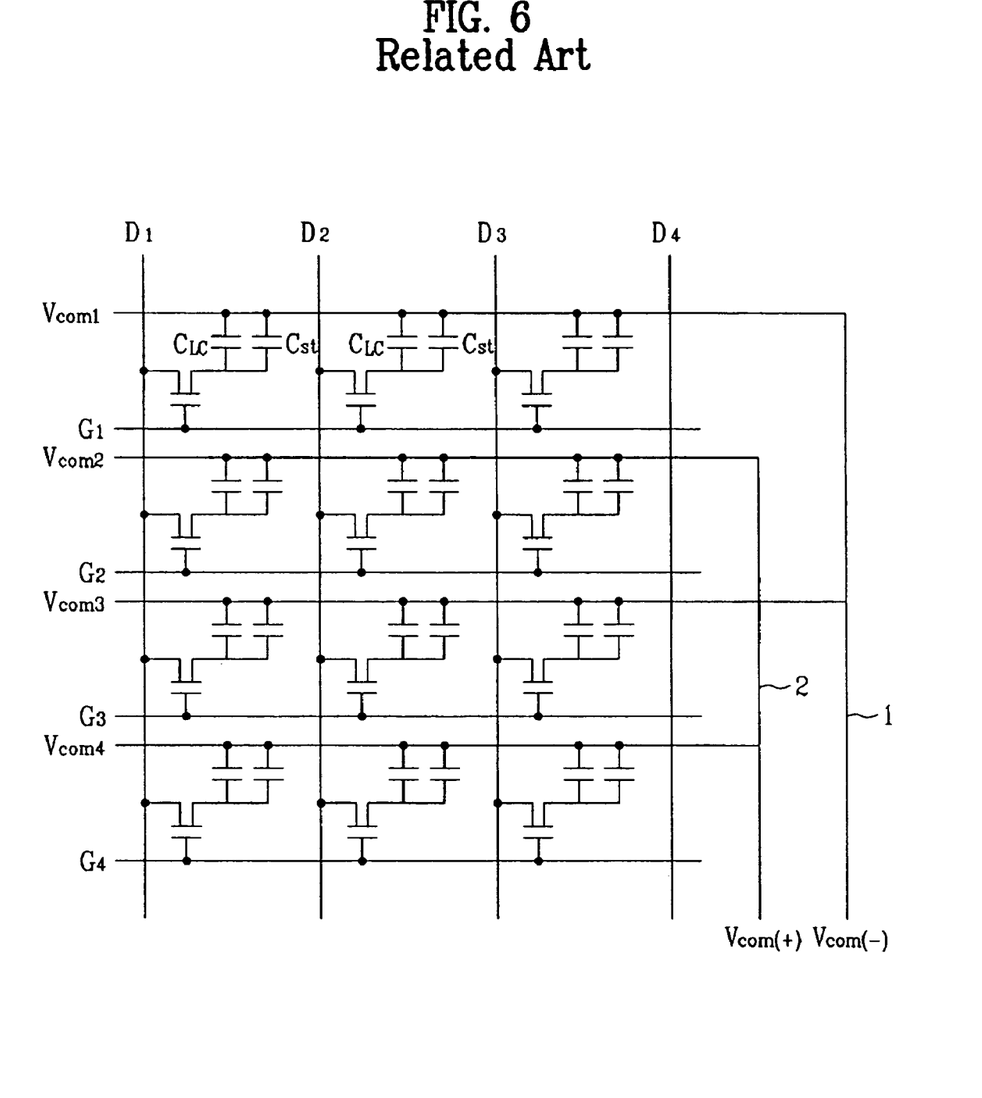
FIG. 6 is an equivalent circuit view of a related art IPS mode LCD device for the increase of electrode interval and for the drop of driving voltage.
Figure 7:
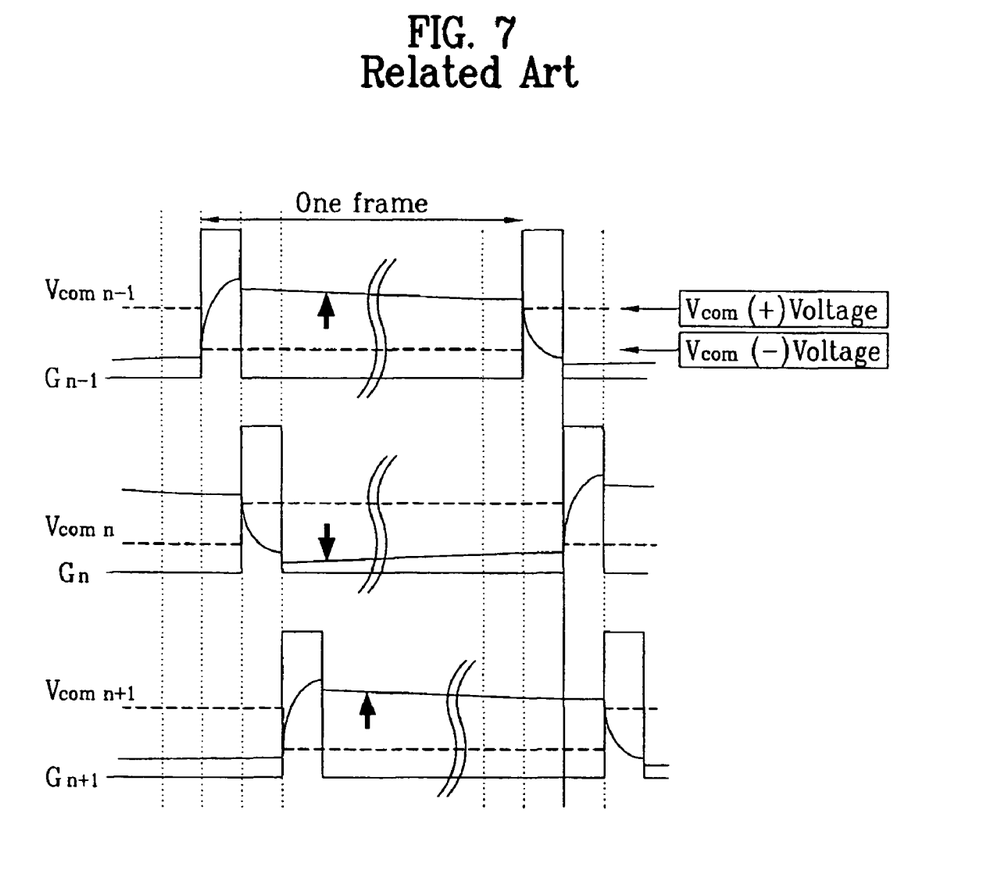
FIG. 7 is a timing view of a pixel voltage in each gate line of FIG. 6.

FIG. 6 is an equivalent circuit view of a related art IPS mode LCD device for the increase of electrode interval, and the drop of driving voltage. FIG. 7 is a timing view of a pixel voltage in each gate line of FIG. 6.

That is, as shown in FIG. 6, a plurality of gate lines (G1, G2, G3, G4, . . . ) are perpendicular to a plurality of data lines (D1, D2, D3, D4, . . . ). Also, each of common lines (Vcom1, Vcom2, Vcom3, . . . ) is formed between the gate lines, and a thin film transistor TFT is formed at a crossing portion of the gate and data lines. In addition, a storage capacitor $C_{st}$ and a liquid crystal capacitor $C_{LC}$ are formed in parallel, between the common line and a pixel electrode ('17' of FIG. 2) connected with a drain electrode of the thin film transistor.

For the increase of the electrode interval and the drop of the driving voltage in the related art IPS mode LCD device, when a first common voltage (or second common voltage) is applied to the odd numbered common line (Vcom1, Vcom3, . . . ), a second common voltage (or first common voltage) is applied to the even numbered common line (Vcom2, Vcom4, . . . ). In this state, the data voltage of the same polarity is applied to the pixels connected with the same common line.

That is, as shown in FIG. 7, if the data voltage of positive (+) polarity is applied to a predetermined pixel, the first common voltage (Vcom(−)) is applied to the corresponding common line. Meanwhile, if the data voltage of negative (−) polarity is applied to a predetermined pixel, the second common voltage (Vcom(+)) is applied to the corresponding common line.

Accordingly, a voltage difference increases between the pixel electrode and the common electrode.

To apply the common voltage together, the odd numbered common lines are connected with one another at one side by a first common voltage supplying line 1, and the even numbered common lines are connected with one another at one side by a second common voltage supplying line 2. Then, the other side in each common line is in the open state.

However, the related art IPS mode LCD device for swing of the common voltage has the following disadvantages.

That is, when separately applying the common voltage to the odd/even numbered common lines, the odd numbered common lines are connected at one side by the first common voltage supplying line, and the even numbered common lines are connected at one side by the second common voltage supplying line. However, the other side in each common line is in the open state, so that the resistance difference of the common lines generates dependent on the position of the common lines. As a result, the common voltage drops due to the resistance difference, and the RC delay increases, thereby deteriorating the picture quality.

SUMMARY

An IPS mode LCD device is provided, having one closed circuit with adjacent odd numbered common lines, and one closed circuit with adjacent even numbered common lines, by dividing the common lines into the odd/even numbered common lines and by swing the common voltage thereto, for the decrease of the common voltage drop and delay.

By way of introduction only, in one aspect, a substrate includes a plurality of gate and data lines crossing each other. The gate and data lines define a plurality of pixel regions. Thin film transistors are formed at crossing portions of the gate and data lines. Common lines are parallel with the gate lines. Common electrodes project from the common lines. Pixel electrodes are connected with drain electrodes of the thin film transistors. The pixel electrodes are formed in the pixel regions between the common electrodes. A first common voltage supplying line connects a closed circuit formed by grouping the adjacent odd numbered common lines. A second common voltage supplying line connects a closed circuit formed by grouping the adjacent even numbered common lines.

In another embodiment, a liquid crystal display (LCD) contains opposing substrates and a liquid crystal layer between the opposing substrates. One of the opposing substrates includes gate and data lines crossing each other. The gate and data lines define pixel regions. Thin film transistors are formed at crossing portions of the gate and data lines. Common lines are parallel with the gate lines. Common electrodes project from the common lines. Pixel electrodes are connected with drain electrodes of the thin film transistors. The pixel electrodes are formed in the pixel regions between the common electrodes. A first common voltage supplying line connects a first set of the common lines together at a plurality of locations along each common line of the first set of the common lines. A second common voltage supplying line connects a second set of the common lines together at a plurality of locations along each common line of the second set of the common lines.

In another embodiment, a method includes forming gate and common lines, covering the gate lines and the common lines with an insulating layer, etching contact holes in the insulating layer, and depositing and patterning a metal layer on the insulating layer. The metal layer forms both data lines that cross the gate lines and define pixel regions, and common voltage supplying lines connecting, through the contact holes, a first set of the common lines together at a plurality of locations along each common line of the first set and connecting a second set of the common lines together at a plurality of locations along each common line of the second set. The data lines and the common voltage supplying lines are then coated with a passivation layer and a transparent conductive material is deposited and patterned on the passivation layer. The patterned transparent conductive material forms pixel electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the embodiments of the present invention, examples of which are illustrated in the accompanying drawings. Wherever possible, the same reference numbers will be used throughout the drawings to refer to the same or like parts.

Hereinafter, an IPS mode LCD device according to one embodiment of the present invention will be described with reference to the accompanying drawings.

Figure 8:
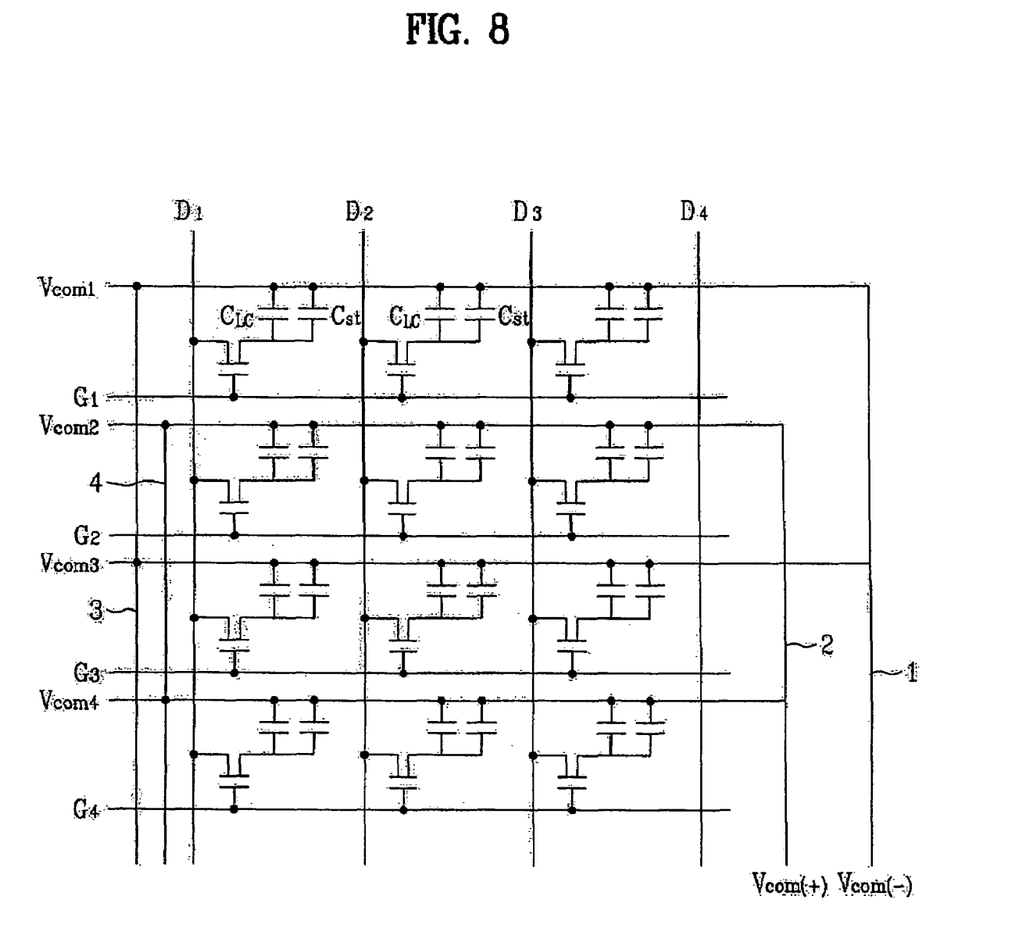
FIG. 8 is an equivalent circuit view of an IPS mode LCD device according to one embodiment of the present invention.

FIG. 8 is an equivalent circuit view of an IPS mode LCD device according to the preferred embodiment of the present invention. The IPS mode LCD device according to the preferred embodiment of the present invention includes a plurality of gate lines (G1, G2, G3, G4, . . . ) and a plurality of data lines (D1, D2, D3, D4, . . . ), a plurality of common lines (Vcom1, Vcom2, Vcom3, . . . ), a plurality of thin film transistors, a pixel electrode ('17' of FIG. 2), and a storage capacitor $C_{st}$ and a liquid crystal capacitor $C_{LC}$. At this time, the plurality of gate lines is formed perpendicular to the plurality of data lines, so as to define a plurality of pixel regions. Also, each of the common lines is formed between each of the gate lines. The thin film transistor is formed at a crossing portion of the gate and data lines. Then, the pixel electrode ('17' of FIG. 2) is connected with a drain electrode of the thin film transistor. The storage capacitor $C_{st}$ and the liquid crystal capacitor $C_{LC}$ are formed in parallel, between each of the common lines.

Among the plurality of common lines, the odd numbered common lines (Vcom1, Vcom3, . . . ) are connected at both sides by first common voltage supplying lines 1, 3, whereby a closed circuit is formed with the adjacent odd numbered common lines. Also, the even numbered common lines (Vcom2, Vcom4, . . . ) are connected at both sides by second common voltage supplying lines 2, 4, whereby another closed circuit is formed with the adjacent even numbered common lines. At this time, the first common voltage supplying lines 1, 3 for applying the common voltage to the odd numbered common lines have the same resistance value as that of the second common voltage supplying lines 2, 4 for applying the common voltage to the even numbered common lines.

For the increase of electrode interval and the drop of driving voltage in the IPS mode LCD device according to the present invention, the first common voltage (or second common voltage) is applied to the odd numbered common lines (Vcom1, Vcom3, . . . ), and the second common voltage (or first common voltage) is applied to the even numbered common lines (Vcom2, Vcom4, . . . ).

Figure 9:
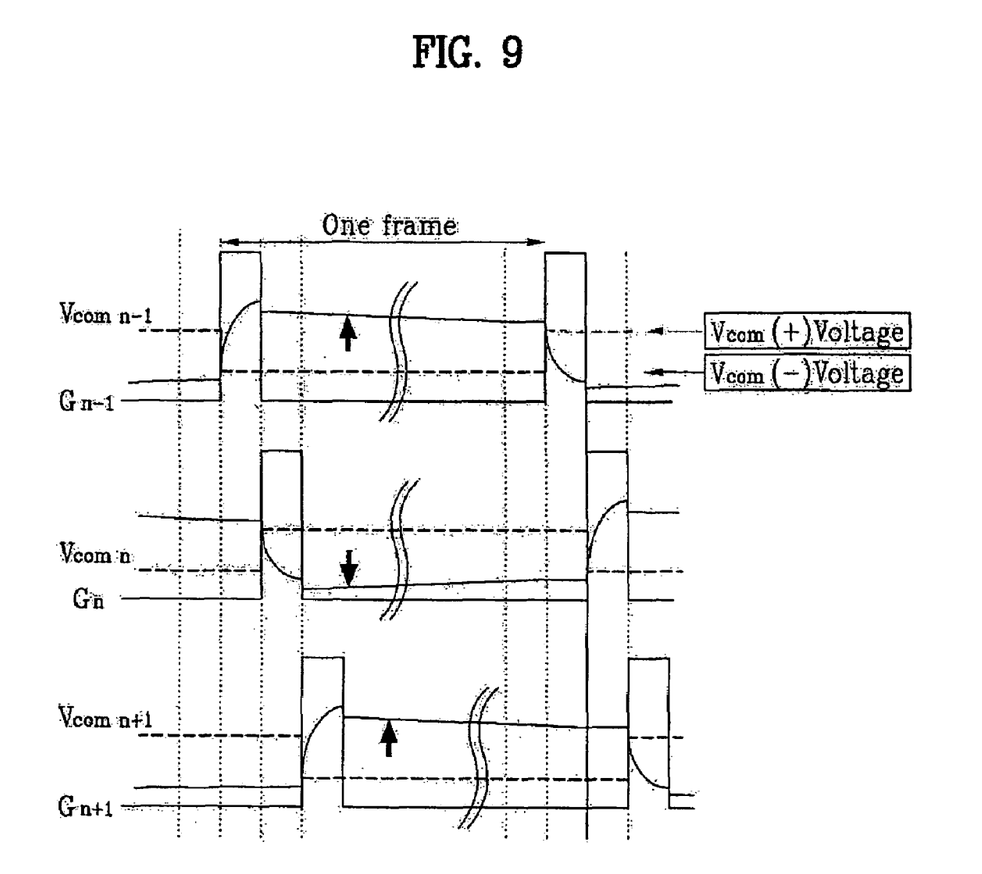
FIG. 9 is a timing view of a pixel voltage in each gate line according to one embodiment of the present invention.

That is, as shown in FIG. 9, when a data voltage of positive (+) polarity is applied to a predetermined pixel region, the first common voltage (Vcom(−)) is applied to the corresponding common line. Meanwhile, when a data voltage of negative (−) polarity is applied to a predetermined pixel region, the second common voltage (Vcom(+)) is applied to the corresponding common line. Accordingly, a voltage difference increases between the pixel electrode and a common electrode.

At this time, if the common voltage is applied to the odd numbered common line by the first common voltage supplying line (1 or 3), or if the common voltage is applied to the even numbered common line by the second common voltage supplying line (2 or 4), it is possible to decrease the RC delay generated by the resistance since the both sides of the common lines are formed of the closed circuits by the common voltage supplying lines. As a result, it is possible to prevent the drop of common voltage and the signal delay.

Also, the odd numbered common lines comprises one closed circuit, and the even numbered common lines comprises another closed circuit, separately, thereby preventing the disconnection of the line.

As explained above, the first common voltage supplying lines 1, 3 are provided at both sides of the odd numbered common lines, and the second common voltage supplying lines 2, 4 are provided at both sides of the even numbered common lines. Also, the respective common voltage supplying lines 1, 2, 3, 4 are formed of the same material as the data line, and the common voltage supplying lines are formed at the same time when forming the data line.

Figure 10A:
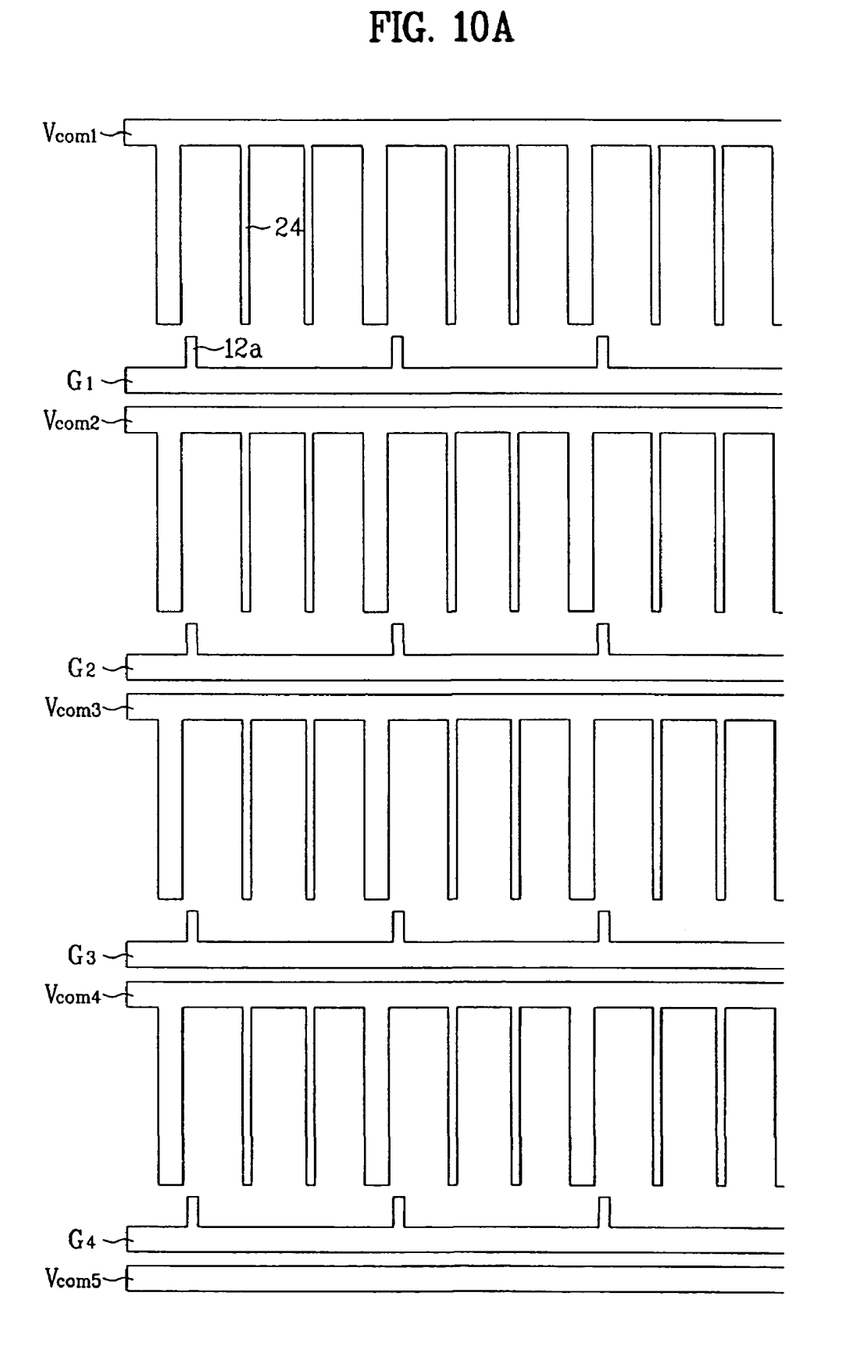
FIG. 10A to FIG. 10C are plane views of the fabrication process for an IPS mode LCD device according to one embodiment of the present invention.
Figure 10B:
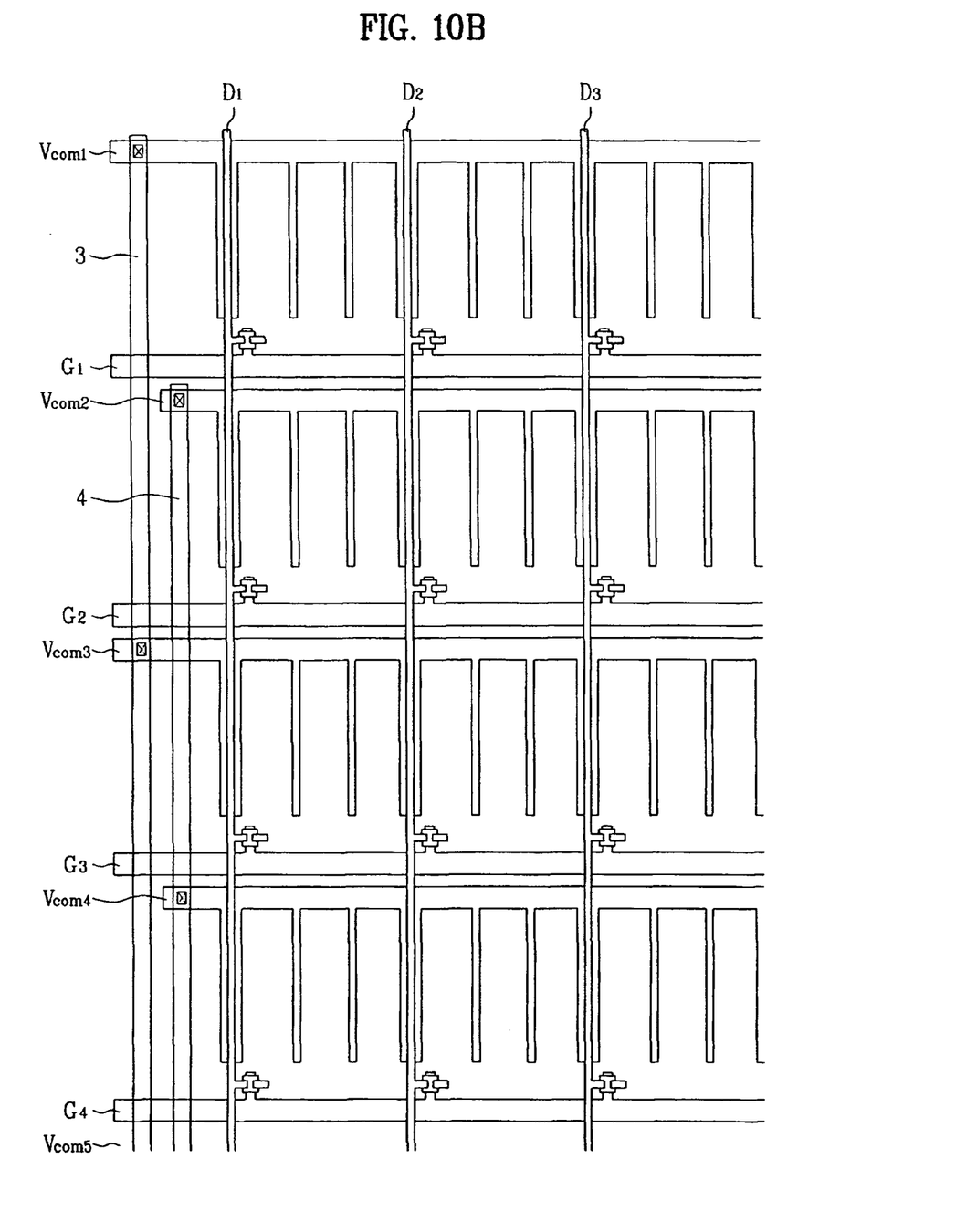
Figure 10C:
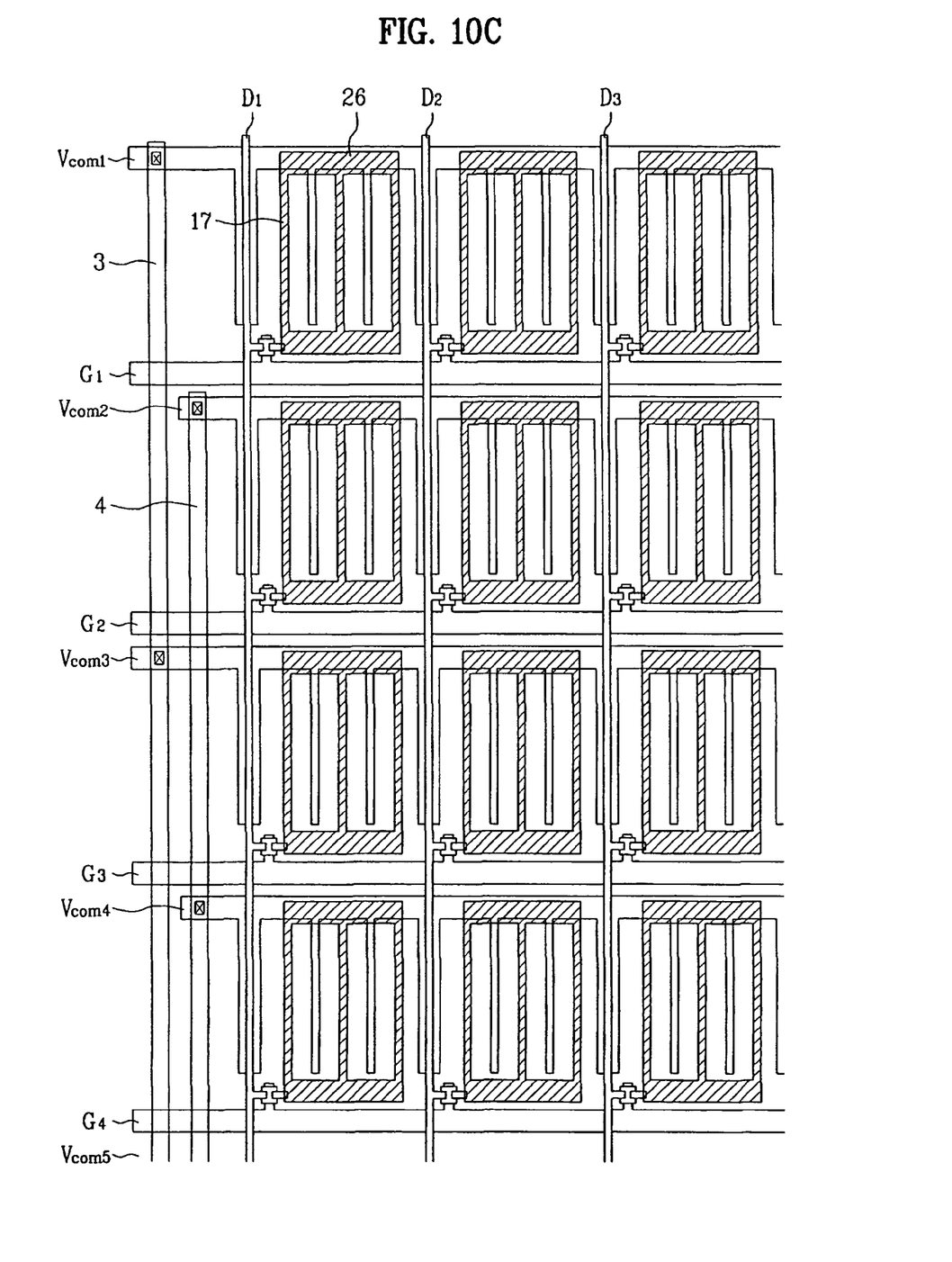

FIG. 10A to FIG. 10C are plane views of the IPS mode LCD device according to one embodiment of the present invention.

First, as shown in FIG. 10A, a low-resistance metal material such as chrome Cr, copper Cu, aluminum Al, molybdenum Mo, or aluminum neodymium AlNd is deposited and patterned on a substrate, thereby forming the plurality of gate lines (G1, G2, G3, G4, ... ) and the common lines (Vcom1, Vcom2, Vcom3, Vcom4, ... ), at the same time. At this time, a gate electrode 12*a* is projected from each of the gate lines. Also, the common electrode 24 perpendicularly projects from each of the common lines (Vcom1, Vcom2, Vcom3, Vcom4, ... ). Then, an inorganic insulating material of silicon nitride $SiN_x$ or silicon oxide $SiO_x$ is deposited on an entire surface of the substrate including the gate line and the common line, thereby forming a gate insulating layer (not shown).

Next, as shown in FIG. 10B, an island-shaped semiconductor layer 14 is formed on the gate insulating layer above the gate electrode 12*a*. In addition, an ohmic contact layer may be formed on the semiconductor layer 14 by implanting impurity ions to an amorphous silicon layer.

After that, a contact hole is formed by selectively removing the gate insulating layer at both ends of the respective common lines (Vcom1, Vcom2, Vcom3, Vcom4, ... ). Then, a metal layer of Cr, Cu, Al, Mo, or AlNd is deposited on the gate insulating layer, and then is patterned, thereby forming the plurality of data lines (D1, D2, D3, D4, ... ) crossing the plurality of gate lines to define the pixel regions, and source/drain electrodes 15*a*/15*b* at both sides of the semiconductor layer 14, at the same time. Simultaneously, the first, second, third, and fourth common voltage supplying lines ('1', '2', '3', '4' of FIG. 8) are formed so as to separately connect the odd/even numbered common lines by the contact hole.

After that, an organic insulating layer of BCB (Benzocyclobutene) or acrylic resin is coated on the entire surface of the substrate including the data lines and the common voltage supplying lines, thereby forming a passivation layer. Herein, the passivation layer is opened to expose the drain electrode 15*b*.

Next, as shown in FIG. 10C, a transparent conductive material such as ITO or IZO is deposited on the passivation layer, and then is patterned, thereby forming the plurality of pixel electrodes 17 in parallel with the common electrode 24. At this time, the respective pixel electrodes 17 have one end formed as one body and connected with the drain electrode 15*b*, and the other end formed as one body and overlapped with the common line, wherein the other end serves as a capacitor electrode 26.

Accordingly, it is possible to form the IPS mode LCD device having separate closed circuits of the odd numbered common lines and the even numbered common lines, without an additional mask process or etching process.

As mentioned above, the IPS mode LCD device according to one embodiment of the present invention has the following advantages.

In the IPS mode LCD device according to one embodiment of the present invention, the odd numbered common lines are separated from the even numbered common lines. In this state, the common voltages have the opposite polarity to that of the data signal applied to the pixel region, the odd numbered common lines comprise one closed circuit, and the even numbered common lines comprise another closed circuit. Accordingly, it is possible to prevent the drop of common voltage and the signal delay since the RC delay generated by the resistance of the common line decreases.

Also, the odd numbered common lines comprises one closed circuit, and the even numbered common lines comprises another closed circuit, separately, thereby preventing the disconnection of the line.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A substrate comprising:
   a plurality of gate and data lines crossing each other, the gate and data lines defining a plurality of pixel regions;
   a plurality of thin film transistors formed at crossing portions of the gate and data lines;
   a plurality of common lines between the gate lines, wherein the common lines alternate with the gate lines in a direction along which the data lines extend;
   a plurality of common electrodes projecting from the common lines;
   a plurality of pixel electrodes connected with drain electrodes of the thin film transistors, the pixel electrodes formed in the pixel regions between the common electrodes;
   a first common voltage supplying line that forms a first closed circuit by grouping adjacent odd numbered common lines; and
   a second common voltage supplying line that forms a second closed circuit by grouping adjacent even numbered common lines,
   wherein the first and second common voltage supplying lines are formed on the same layer as the data lines, and the common lines and the common electrodes are on the same layer as the gate lines,
   wherein the first common voltage supplying lines connected with the odd numbered common lines through first contact holes formed in an insulating layer at both ends of the respective odd numbered common lines,
   wherein the second common voltage supplying lines connected with the even numbered common lines through second contact holes formed in an insulating layer at both ends of the respective even numbered common lines, and
   wherein the first and second contact holes are formed on an outer region of a display region including the plurality of the pixel regions and are not formed in the display region,
   wherein the first contact holes are respectively formed at portions that the first common voltage supplying lines overlap the odd numbered common lines so that the first common voltage supplying lines directly contact with the odd numbered common lines through the first contact holes formed on the outer region,
   wherein the second contact holes are respectively formed at portions that the second common voltage supplying lines overlap the even numbered common lines so that the second common voltage supplying lines directly contact with the even numbered common lines through the second contact holes formed on the outer region.

2. The substrate of claim 1, wherein a first common voltage applied by the first common voltage supplying line and a second common voltage applied by the second common voltage supplying line have opposite polarities.

3. The substrate of claim 2, wherein the first common voltage and the second common voltage alternate polarities each frame.

4. The substrate of claim 1, wherein the first and second common voltage supplying lines have the same resistivity.

5. The substrate of claim 1, wherein the common electrodes are parallel with the data lines.

6. A liquid crystal display (LCD) comprising:
opposing substrates; and
a liquid crystal layer between the opposing substrates,
wherein one of the opposing substrates includes:
a plurality of gate and data lines crossing each other, the gate and data lines defining a plurality of pixel regions;
a plurality of thin film transistors formed at crossing portions of the gate and data lines;
a plurality of common lines parallel with the gate lines, wherein the common lines alternate with the gate lines in a direction along which the data lines extend;
a plurality of common electrodes projecting from the common lines, the common electrodes parallel with the data lines;
a plurality of pixel electrodes connected with drain electrodes of the thin film transistors, the pixel electrodes formed in the pixel regions between the common electrodes;
a first common voltage supplying line that connects a first set of the common lines together at a plurality of locations along each common line of the first set of the common lines; and
a second common voltage supplying line that connects a second set of the common lines together at a plurality of locations along each common line of the second set of the common lines,
wherein the first and second set of common lines alternate in a direction along which the data lines extend,
wherein the first and second common voltage supplying lines are formed on the same layer as the data lines, and the common lines and the common electrodes are on the same layer as the gate lines,
wherein the first common voltage supplying lines connected with the first set of the common lines through first contact holes formed in an insulating layer at both ends of the respective odd numbered common lines,
wherein the second common voltage supplying lines connected with the second set of the common lines through second contact holes formed in an insulating layer at both ends of the respective even numbered common lines, and
wherein the first and second contact holes are formed on an outer region of a display region including the plurality of the pixel regions and are not formed in the display region,
wherein the first contact holes are respectively formed at portions that the first common voltage supplying lines overlap the odd numbered common lines so that the first common voltage supplying lines directly contact with the odd numbered common lines through the first contact holes formed on the outer region,
wherein the second contact holes are respectively formed at portions that the second common voltage supplying lines overlap the even numbered common lines so that the second common voltage supplying lines directly contact with the even numbered common lines through the second contact holes formed on the outer region.

7. The LCD of claim 6, wherein a first common voltage applied by the first common voltage supplying line and a second common voltage applied by the second common voltage supplying line have opposite polarities.

8. The LCD of claim 7, wherein the first common voltage and the second common voltage alternate polarities each frame.

9. The LCD of claim 6, wherein the first and second common voltage supplying lines have the same resistivity.

10. The LCD of claim 6, wherein the common electrodes are parallel with the data lines.

* * * * *